United States Patent

Nelson et al.

[11] Patent Number: 5,608,051
[45] Date of Patent: Mar. 4, 1997

[54] ACETYLATION OF LIGNOCELLULOSIC MATERIALS

[75] Inventors: Helen L. Nelson; David I. Richards, both of Humberside, United Kingdom; Rune Simonson, Partille, Sweden

[73] Assignee: BP Chemicals Limited, London, England

[21] Appl. No.: 322,267

[22] Filed: Oct. 13, 1994

[30] Foreign Application Priority Data

Oct. 28, 1993 [GB] United Kingdom ............ 9322187

[51] Int. Cl.$^6$ .................................................. C08B 3/06
[52] U.S. Cl. .................................................. 536/76
[58] Field of Search .................................................. 376/76

[56] References Cited

U.S. PATENT DOCUMENTS

| | | | |
|---|---|---|---|
| 1,536,334 | 5/1925 | Farrow, Jr. | 536/76 |
| 2,417,995 | 3/1947 | Stamm et al. | 8/121 |
| 2,780,511 | 2/1957 | Takagi et al. | 8/121 |
| 3,094,431 | 6/1963 | Goldstein et al. | 8/121 |
| 3,403,145 | 9/1968 | Edge et al. | 8/120 |
| 3,528,115 | 9/1970 | Lawes et al. | 8/111 |
| 3,720,661 | 3/1973 | Breton et al. | 8/121 |
| 4,085,760 | 4/1978 | Toyoshima et al. | 131/345 |
| 4,621,437 | 11/1986 | Grande et al. | 34/10 |
| 5,525,721 | 6/1996 | Oshima et al. | 536/69 |

FOREIGN PATENT DOCUMENTS 0213252  3/1987  European Pat. Off. .

*Primary Examiner*—Jeffrey C. Mullis
*Attorney, Agent, or Firm*—Brooks Haidt Haffner & Delahunty

[57] ABSTRACT

This invention relates to a process for the acetylation of lignocellulosic materials (LM) by (a) bringing the LM into the intimate contact with an acetylating agent comprising acetic anhydride at a temperature from 70°–140° C. and (b) bringing the acetylated LM from step (a) into contact with a superheated chemical agent comprising acetic acid and/or anhydride at a temperature above 140° C. so as to reduce the acetic acid or acetic anhydride content of the acetylated LM to below 10% by weight. LM's treated in this manner have excellent dimensional stability.

3 Claims, 1 Drawing Sheet

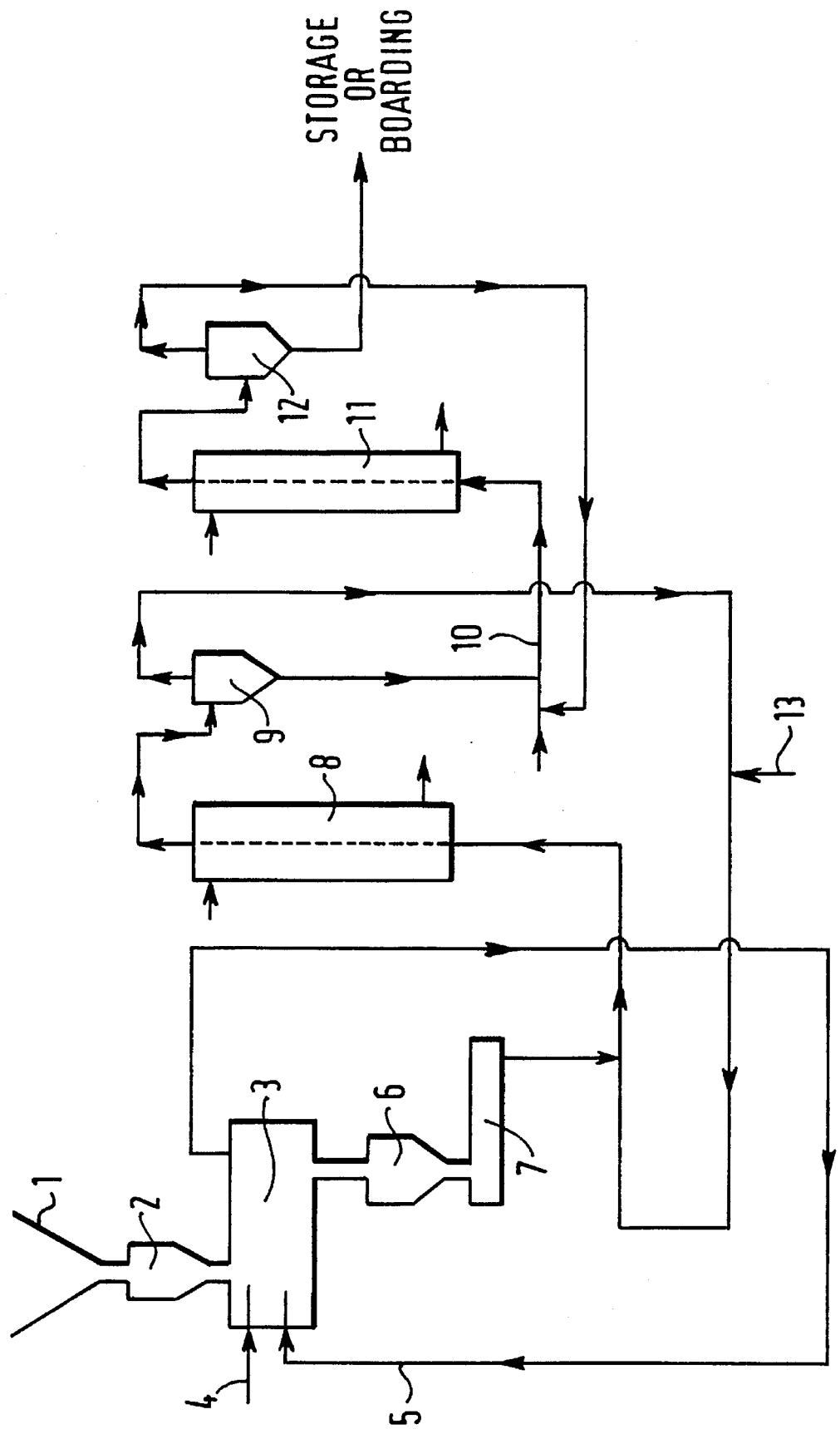

ACETYLATION OF LIGNOCELLULOSIC MATERIALS

The present invention relates to a process for the production of acetylated lignocellulosic materials wherein the lignocellulosic material is treated with acetic anhydride.

By the expression "lignocellulosic materials" is meant here and throughout the specification a material in any shape or form such as e.g. shreds, fibres, splinters and shives, and which are derivable from a source comprising wood, sisal, jute, coconut and/or other plant material and which have optionally been subjected to a pretreatment with a non-acetylating chemical such as e.g. sodium acetate in order to improve subsequent acetylation thereof will hereafter be referred to as "LM" for convenience.

It is well known in the art to improve the physical characteristics of LMs by treatment with acetic acid and/or acetic anhydride. Processes by which LM's are treated in a single step by immersion of the LM in liquid acetic anhydride followed by heating and a drying step are known. One of the problems with systems which use the immersion technique is that they are usually batch processes which need drainage facilities for the liquid in which the LM is immersed. A single step process of this type also does not ensure acetylation of the lignocellulosic material to the desired degree nor the removal of all of the unreacted chemicals in the treated product.

It has now been found that the above problems can be mitigated by treating the LM with acetic anhydride in two stages, if necessary, in a continuous process.

Accordingly, the present invention is a process for the acetylation of lignocellulosic materials (LM) comprising a. bringing the LM into intimate contact with an acetylating agent comprising acetic anhydride as the major component at a temperature from 70°–140° C. and b. bringing the acetylated LM from step (a) into contact with a superheated chemical vapour comprising acetic acid and/or anhydride at a temperature above 140° C. and reducing the acetic acid or acetic anhydride content of the acetylated LM produced in step (a) to below 10% by weight by stripping.

In the process, the acetylating agent used in step (a) suitably comprises at least 50% w/w of acetic anhydride, preferably at least 60% w/w and most preferably at least 70% w/w and typically contains 90% acetic anhydride and 10% acetic acid. This agent may be in the form of a liquid, a vapour or a mixture of the two. Thus the weight ratio of liquid to vapour in the reactor may be anything within the range from 100% of one to 100% of the other, but is suitably from 1:5 to 5:1 and is preferably 1:2. The acetylating agent is pre-heated to a temperature in the region from 70°–140° C., preferably from 80°–140° C., more preferably from 110°–130° C. using e.g. an oil jacket or a steam coil.

The LM is contacted with the acetylating agent in a first reactor. The LM is suitably rendered gas tight e.g. by compaction using e.g. a plug screw feeder, at the point of entry into the reactor so as to minimise ingress of air into the acetylation reaction or egress of acetic anhydride out of this first reactor. This problem of egress of acetic anhydride can be minimised by operating the first reactor at a pressure which is slightly below atmospheric and is also a safety feature of the process. The compacted LM is then introduced into the first reactor which is suitably a screw-conveyor at the same time injecting into said reactor the hot acetylating agent. During this step, the compacted LM is dispersed (in order to loosen the LM strands and to spread it more thinly) using a dispersing device located at the entrance to this first reactor and thereby facilitates intimate contact between the LM and the acetylating agent. In the first reactor, the rate of injection of the hot acetylating agent is suitably such that the ratio of the agent to the LM is suitably in the range from 1:1 to 10:1 by weight, preferably from 3:1 to 7:1, e.g. 5:1 by weight. During this acetylation reaction, which is exothermic, the reaction temperature is maintained substantially constant which may be achieved by several conventional means, e.g. by controlling the pressure in the reactor, or, by vapourisation of the acetylating chemicals, or, by control of the rate of flow of the acetylating agent into the first reactor using flow control valves and monitoring the rate of flow, or, by controlling the composition of the hot acetylating agent injected into the reactor. It is preferable to achieve this temperature control by the vapourisation method whereby the vapour leaving the first reactor is such that it is at its dewpoint. The amount of acetic anhydride in the acetylating agent in the vapour at its dewpoint may be in the range from 30–95% by weight, preferably 70% by weight, which can be filtered to remove any suspended LM therein and recycled. The contact time in this first reactor is suitably at least 1 minute, preferably from 6–30 minutes. The bulk of the acetylation of the fibres may take place in this first reactor.

The resultant acetylated LM from step (a) suitably contains a controlled amount of liquid which may be up to 110% by weight of the acetylated LM but is preferably e.g. about 40% by weight. The amount of liquid in the acetylated LM can be controlled by controlling the flow rate and/or the reaction temperature.

In order to proceed with step (b), the acetylated LM from step (a) containing about 40% by weight of liquid is suitably re-compacted using a plug screw feed as described previously and dispersed (in order to loosen the LM strands and to spread it more thinly) using a device similar to that used in the first reactor in order to create a gas tight seal. However, the same effect may be acheived using e.g. a star feeder device. A further amount of a superheated chemical agent, which comprises acetic acid and/or acetic anhydride and is in its vapour state, is introduced at a point after the acetylated LM is dispersed so as to entrain said dispersed LM and to transport it to a second reactor. This superheated chemical agent is suitably the acetylating medium used in the first reactor which is used to start-up the process for the second step if a further marginal increase in the acetylation of the LM is desired. In this case as the vapours emerging overhead from the second reactor build up, such vapours can be admixed with the aliquots of acetic anhydride being superheated and can thereby comprise a mixture of acetic anhydride and some acetic acid as the reaction progresses over a period of time. In this instance, the superheated chemical agent suitably comprises 50–100% by weight, preferably 70–95% by weight of acetic anhydride. On the other hand, if in step (b) it is only required to strip the acetylated LM from step (a) of substantially all of its acetic anhydride content, then the superheated chemical agent in its vapour state may comprise predominantly of acetic acid. Where a recycled mixture of acetic anhydride and acetic acid is used for step (b), the amount of acetic anhydride in such a mixture is suitably at least 1% by weight, preferably 5–95% by weight, more preferably from 50–95% by weight of the mixture. The superheated chemical agent is at a temperature above 140° C., suitably from 140°–220° C., preferably from 185°–195° C. and the second reactor is suitably operated at a pressure of 100–150 KPa. The primary function of this second step is to reduce the content of the unreacted acetylating medium remaining in the acetylated LM emerging from step (a) i.e. by stripping. This step may also improve the acetylation achieved in the first reactor although any improvement may only be marginal in relation to the major acctylation of the fibre already achieved in the first reactor. Thus, vapours removed from this reactor can be recirculated either to the hot acetylating agent used in the first reactor or to the superheated chemical agent used for entraining the dispersed, acetylated LM transported to the second reactor as described above. The duration of this drying/stripping step is relatively short and is usually of the order of less than 1 minute.

The duration of the acetylation reaction of the LM in either or both of these reactors will be determined by the degree of acetylation desired and the nature and amount of the acetylatable material present in the LM. Thus the degree of acetylation is suitably such that the acetylated LM achieves a weight gain of at least 2%, preferably at least 5% and more preferably from 5–25% by weight.

The stripped, acetylated LM product emerging from step (b) can be further processed in a hydrolysis chamber in order to remove or at least minimise the odour of the chemicals in the acetylated LM. For instance, the stripped product which is usually at an elevated temperature of about 130°–160° C. may be dispersed (in order to loosen the LM strands and to spread it more thinly) and entrained in a current of steam optionally with one or more other entraining gases. It is preferable to use superheated steam and in this instance, any residual unreacted acetic anhydride remaining adsorbed or occluded in the acetylated LM is hydrolysed to acetic acid and removed overhead as a mixture of steam and acetic acid from the hydrolysis chamber. This mixed vapour may be recirculated to the superheated steam being introduced into the hydrolysis chamber. The effect of this step is that it significantly reduces the acetic acid or anhydride odour of the treated LM product by removing substantially all of the unreacted acetic anhydride therefrom and also most of the acetic acid therein. The amount of acetic acid left behind in the acetylated product is suitably less than 0.5% wt/wt.

The acetylated LM after removal of any residual unreacted anhydride using superheated steam and emerging from the hydrolysis chamber is usually at a temperature of about 150° C. This product can be sent either directly to an adjoining plant where said product can be formed into the desired shapes e.g. boards, or, can be subjected to a further humidifying and a cooling step in order to bag the material for storage and distribution. This may be achieved by passing a current of steam and air over the treated LM emerging from the hydrolysis chamber so as to cool the treated LM to about 40° C. and to humidify it.

The process of the present invention is particularly suitable for acetylating fibres of LM, especially wood fibres, which may vary in dimensions e.g. from 0.03 mm to 4 mm. Furthermore, the process of the present invention can be operated batchwise or continuously, an option not available in the conventional processes used hitherto.

BRIEF DESCRIPTION OF THE DRAWING

The present invention is further illustrated with reference to the accompanying schematic flow diagram and the associated description below. The schematic flow diagram of the process shown in the drawing includes a hopper (1), a plug-screw feeder (2), a first reactor (3), a feeder (6), a dispersing device (7), a second reactor (8), a circulation cyclone (9), a steam stripper (11), a steam stripper cyclone (12), and introduction of superheated vapor at (13).

Raw LM e.g. the fibre is fed via a hopper (1) to a plug-screw feeder (2) where the fibre is compacted to reduce the permeability of the fibre to gas flow. The plug-screw feeder (2) discharges the compacted fibre to the first reactor (3) which is purged with nitrogen before the injection of a pre-heated acetylating agent which is a mixture of acetic acid (about 10% by wt) and acetic anhydride (about 90% by wt) both in liquid and in vapour form along lines (4) and (5) respectively into said reactor (3). The compacted fibre is dispersed with a dispersing device (not shown) located at the entrance of the compacted material into reactor (3) as the fibre is brought into contact with the acetylating agent. Reactor (3) is maintained at a pressure slightly below atmospheric in order to prevent back flow of the acetylating agent into the plug-screw feeder or into lines (4) and (5). Reactor (3) is maintained at a temperature of about 120° C. by means of steam heating. The acetylation of the fibre is an exothermic reaction and the reaction temperature is maintained by the vapourisation of the liquid components of the acetylating agent therein. Chemical vapour at its dewpoint, containing about 70% by weight acetic anhydride emerges overhead from this reactor and is filtered before being recovered and recycled. The amount of liquid in the acetylated fibre emerging from the base of reactor (3) is controlled at about 40% by weight and this fibre is re-compacted in a further plug-screw feeder (6) before being dispersed again in a dispersing device (7) and subjected to a further treatment with a superheated vapour of acetic anhydride either containing neat acetic anhydride introduce at (13) or optionally containing some acetic acid from recycled streams at about 190° C. The fibre so treated is entrained in the superheated vapour stream emerging from the base thereof and transported to a second reactor (8) which is a steam jacketed circulation stripper where the chemicals adsorbed or occluded in the fibre are evaporated. The overheads from the circulation stripper (8) entraining the fibre are fed into a circulation cyclone (9) where hot fibre is recovered from the base thereof and is fed through a cell feeder (not shown) into line (10). In line (10) the fibre is dispersed in and entrained by a mixture of superheated steam and some acetic acid vapour (from partly recycled streams) and is then fed into a steam stripper (11). In (11), any residual acetic anhydride in the fibre is hydrolysed to acetic acid and the acetic acid is stripped out. The overheads from the steam stripper (11), which are at a temperature of about 150° C., are fed into a steam stripper cyclone (12) where the fibre is separated from the vapours and recovered from the base thereof whereas the acidic vapours are recovered overhead therefrom to be processed and recycled. The acetylated fibres substantially free of all free acids and anhydrides (and hence the odours of these components) recovered from the base of (12) can either be sent to an adjacent board manufacturing facility (not shown) directly or can be humidified and cooled for the purposes of bagging and storage (not shown).

The process of the present invention is further illustrated with reference to the following Examples:

EXAMPLES

Each of the following Examples simulated in a static mode, the effect of exposing an aliquot of wood fibre sequentially to vapours of a saturated acetylating agent in step (a) and a superheated, acetylating agent in step (b). Thus, one gram of a mixed pine (60%) and spruce (40%) wood fibre was held in a mesh basket inside a reactor chamber heated to a temperature of 185° C. The reactor was heated to prevent condensation of the acetylating agent on the reactor walls. Flows of vapour (saturated and superheated) of the acetylating agent/acetic anhydride were introduced into the reactor so as to pass through and penetrate the fibre, and it was possible to change quickly from saturated vapour in step (a) to superheated vapour in step (b). All reactions were conducted at slightly reduced pressure to minimise leaks of the anhydride and to maintain a steady flow of the vapour. The specific conditions used and the results achieved in the two Examples were as follows:

1. A close simulation of the pilot plant design:
   Step (a):
   Saturated vapour: 5% v/v acetic acid in acetic anhydride
   Flow of vapour: 30 g/min for 10 minutes at 136° C.
   Step (a) Product: acetyl content of 15.8% & 42% residual acid
   Step (b):
   Superheated vapour: 30% v/v acetic acid in acetic anhydride at 185° C.
   Flow of vapour: 35 g/min for 2 minutes
   Step (b) Product: acetyl content of 17.9% & 4% residual acid.

2. Step (a):
   Conditions same as in Example (1) above.
   Step (b):
   Superheated vapour: 60% v/v acetic acid in acetic anhydride at 195° C.
   Flow of vapour: 35 g/min for 1 minute.
   Step (b) Product: acetyl content of 16.7% & 1% residual acid.

We claim:

1. A process for the acetylation of lignocellulosic materials (LM) comprising
   (a) bringing the LM into intimate contact with an acetylating agent comprising acetic anhydride as the major component in a first reactor at a temperature from 70°–140° C. to form an acetylated LM and maintaining said temperature constant by a vaporization method whereby the vapor leaving the first reactor is at its dew point; and
   (b) bringing acetylated LM from step (a) into contact with a superheated chemical vapor comprising acetic acid and/or acetic anhydride in a second reactor at a temperature above 140° C. and reducing the acetic acid or acetic anhydride content of the acetylated LM produced in step (a) to below 10% by weight by stripping.

2. A process for the acetylation of lignocellulosic materials (LM) comprising
   (a) bringing the LM into intimate contact with an acetylating agent comprising acetic anhydride as the major component in a first reactor at a temperature from 70°–140° C. to form an acetylated LM, dispersing and entraining the acetylated LM emerging from step (a) in a superheated chemical agent comprising acetic acid and/or acetic anhydride in its vapor state to transport the acetylated LM to a second reactor, and
   (b) bringing the acetylated LM from step (a) into contact with a superheated chemical vapor comprising acetic acid and/or anhydride in the second reactor at a temperature above 140° C. and reducing the acetic acid or acetic anhydride content of the acetylated LM produced in step (a) to below 10% by weight by stripping.

3. A process for the acetylation of lignocellulosic materials (LM) comprising:
   (a) bringing the LM into intimate contact with an acetylating agent comprising acetic anhydride as the major component in a first reactor at a temperature from 70°–140° C. to form an acetylated LM, and
   (b) bringing the acetylated LM from step (a) into contact with a superheated chemical vapor comprising predominantly acetic acid in a second reactor at a temperature above 140° C. and reducing the acetic acid or acetic anhydride content of the acetylated LM produced in step (a) to below 10% by weight by stripping.

* * * * *